(12) United States Patent
Steele et al.

(10) Patent No.: US 6,765,476 B2
(45) Date of Patent: Jul. 20, 2004

(54) MULTI-LEVEL RF IDENTIFICATION SYSTEM

(75) Inventors: Kerry D. Steele, Kennewick, WA (US); Gordon A. Anderson, Benton City, WA (US); Ronald W. Gilbert, Benton City, WA (US)

(73) Assignee: Battelle Memorial Institute Kl-53, Richland, WA (US)

( * ) Notice: Subject to any disclaimer, the term of this patent is extended or adjusted under 35 U.S.C. 154(b) by 111 days.

(21) Appl. No.: 09/802,408

(22) Filed: Mar. 9, 2001

(65) Prior Publication Data

US 2002/0158752 A1 Oct. 31, 2002

(51) Int. Cl.⁷ .................................................. H04Q 5/22
(52) U.S. Cl. ..................................................... 340/10.4
(58) Field of Search ............................ 340/10.4, 10.42, 340/10.34, 825.72, 870.31, 384.7; 332/159, 102, 109, 160; 331/109, 183, 107 A; 329/359

(56) References Cited

U.S. PATENT DOCUMENTS

| | | | | |
|---|---|---|---|---|
| 2,863,995 A | * | 12/1958 | Chow | 329/359 |
| 3,648,195 A | * | 3/1972 | Marino | 332/102 |
| 3,815,048 A | * | 6/1974 | Hamlet | 331/109 |
| 3,882,425 A | * | 5/1975 | Briley | 332/159 |
| 4,054,871 A | | 10/1977 | Terrell et al. | 343/7.7 |
| 4,075,632 A | | 2/1978 | Baldwin et al. | 343/6.8 R |
| 4,135,168 A | | 1/1979 | Wade | 331/108 R |
| 4,360,810 A | | 11/1982 | Landt | 343/6.5 R |
| 5,198,807 A | | 3/1993 | Troyk et al. | 340/825.54 |
| 5,649,295 A | | 7/1997 | Shober et al. | 455/38.2 |
| 5,701,121 A | * | 12/1997 | Murdoch | 340/10.34 |
| 5,751,197 A | * | 5/1998 | Boling, III | 331/107 A |
| 5,828,693 A | | 10/1998 | Mays et al. | 375/202 |
| 5,974,078 A | | 10/1999 | Tuttle et al. | 375/200 |
| 6,144,299 A | * | 11/2000 | Cole | 310/572.1 |
| 6,310,540 B1 | * | 10/2001 | Burnett et al. | 340/384.7 |

FOREIGN PATENT DOCUMENTS

| | | |
|---|---|---|
| DE | 199 26 748 A1 | 12/2000 |
| EP | 0 790 702 A2 | 8/1997 |
| EP | 0 853 245 A2 | 7/1998 |

* cited by examiner

Primary Examiner—Michael Horabik
Assistant Examiner—William Bangachon
(74) Attorney, Agent, or Firm—Seed IP Law Group PLLC

(57) ABSTRACT

A radio frequency identification system having a radio frequency transceiver for generating a continuous wave RF interrogation signal that impinges upon an RF identification tag. An oscillation circuit in the RF identification tag modulates the interrogation signal with a subcarrier of a predetermined frequency and modulates the frequency-modulated signal back to the transmitting interrogator. The interrogator recovers and analyzes the subcarrier signal and determines its frequency. The interrogator generates an output indicative of the frequency of the subcarrier frequency, thereby identifying the responding RFID tag as one of a "class" of RFID tags configured to respond with a subcarrier signal of a predetermined frequency.

21 Claims, 4 Drawing Sheets

MULTI-LEVEL RF IDENTIFICATION SYSTEM

This invention was made with Government support under Contract DE-AC0676RLO1830 awarded by the U.S. Department of Energy. The Government has certain rights in the invention.

TECHNICAL FIELD

The present invention relates to RF identification (RFID) tag systems, and particularly to RFID tags that communicate using frequency modulation.

BACKGROUND INFORMATION

Remote communication utilizing wireless equipment typically relies on radio frequency (RF) technology, which is employed in many industries. One application of RF technology is in locating, identifying, and tracking objects, such as animals, inventory, and vehicles.

RF identification (RFID) tag systems have been developed that facilitate monitoring of remote objects. As shown in FIG. 1, a basic RFID system 10 includes two components: an interrogator or reader 12, and a transponder (commonly called an RF tag) 14. The interrogator 12 and RF tag 14 include respective antennas 16, 18. In operation, the interrogator 12 transmits through its antenna 16 a radio frequency interrogation signal 20 to the antenna 18 of the RF tag 14. In response to receiving the interrogation signal 20, the RF tag 14 produces an amplitude-modulated response signal 22 that is modulated back to the interrogator 12 through the tag antenna 18 by a process known as backscatter.

The conventional RF tag 14 includes an amplitude modulator 24 with a switch 26, tag 14 is activated by the interrogation signal 20, a driver (not shown) creates a modulating on/off signal 27 based on an information code, typically an identification code, stored in a non-volatile memory (not shown) of the RF tag 14. The modulating signal 27 is applied to a control terminal of the switch 26, which causes the switch 26 to alternately open and close. When the switch 26 is open, the tag antenna 18 reflects a portion of the interrogation signal 20 back to the interrogator 12 as a portion 28 of the response signal 22. When the switch 26 is closed, the interrogation signal 20 travels through the switch 26 to ground, without being reflected, thereby creating a null portion 29 of the response signal 22. In other words, the interrogation signal 20 is amplitude-modulated to produce the response signal 22 by alternately reflecting and absorbing the interrogation signal 20 according to the modulating signal 27, which is characteristic of the stored information code. The RF tag 14 could also be modified so that the interrogation signal is reflected when the switch 26 is closed and absorbed when the switch 26 is open. Upon receiving the response signal 22, the interrogator 12 demodulates the response signal 22 to decode the information code represented by the response signal. The conventional RFID systems thus operate with an oscillator or clock in which the RF tag 14 modulates a RF carrier frequency to provide an indication to the interrogator 12 that the RF tag 14 is present.

The substantial advantage of RFID systems is the non-contact, non-line-of-sight capability of the technology. The interrogator 12 emits the interrogation signal 20 with a range from one inch to one hundred feet or more, depending upon its power output and the radio frequency used. Tags can be read through a variety of substances such as odor, fog, ice, paint, dirt, and other visually and environmentally challenging conditions where bar codes or other optically-read technologies would be useless. RF tags can also be read at remarkable speeds, in most cases responding in less than one hundred milliseconds.

A typical RF tag system 10 often contains a number of RF tags 14 and the interrogator 12. RF tags are divided into three main categories. These categories are beam-powered passive tags, battery-powered semi-passive tags, and active tags. Each operates in fundamentally different ways.

The beam-powered RF tag is often referred to as a passive device because it derives the energy needed for its operation from the interrogation signal beamed at it. The tag rectifies the field and changes the reflective characteristics of the tag itself, creating a change in reflectivity that is seen at the interrogator. A battery-powered semi-passive RF tag operates in a similar fashion, modulating its RF cross-section in order to reflect a delta to the interrogator to develop a communication link. Here, the battery is the source of the tag's operational power. Finally, in the active RF tag, a transmitter is used to create its own radio frequency energy powered by the battery.

The range of communication for such tags varies according to the transmission power of the interrogator 12 and the RF tag 14. Battery-powered tags operating at 2,450 MHz have traditionally been limited to less than ten meters in range. However, devices with sufficient power can reach up to 200 meters in range, depending on the frequency and environmental characteristics.

Conventional continuous wave backscatter RF tag systems utilizing passive (no battery) RF tags require adequate power from the interrogation signal 20 to power the internal circuitry in the RF tag 14 used to amplitude-modulate the response signal 22 back to the interrogator 12. While this is successful for tags that are located in close proximity to an interrogator 12, for example less than three meters, this may be insufficient range for some applications, for example, which require greater than 100 meters.

BRIEF SUMMARY OF THE INVENTION

The present invention provides a radio frequency identification system having a radio frequency transceiver for generating a continuous wave RF interrogation signal that impinges upon a RF identification tag. An oscillation circuit in the RF identification tag modulates the interrogation signal with a subcarrier of a predetermined frequency and modulates the frequency-modulated signal back to the transmitting interrogator. The interrogator recovers and analyzes the subcarrier signal and determines its frequency. According to one aspect of the invention, the interrogator generates an output indicative of the frequency of the subcarrier frequency, thereby identifying the responding RF identification tag as one of a "class" of RF identification tags configured to respond with a subcarrier signal of a predetermined frequency.

According to various aspects of the invention, the RF identification tag includes a RF antenna configured to receive the interrogation signal, a rectifier having an input coupled to the radio frequency antenna and an output, and a tag oscillator having an input coupled to the output of the rectifier and an output coupled to an input of the RF antenna. The tag oscillator generates an output signal modulating the RF interrogation signal with the subcarrier RF signal.

According to one aspect of the invention, the RF identification tag oscillator further is either a single-transistor oscillator or a uni-junction transistor oscillator.

According to still other aspects of the invention, the tag oscillator in the RF identification tag is activated by the RF interrogation signal received at the tag antenna. According to various aspects of the invention, the RF tag system is a "passive" system, wherein the tag oscillator is powered by a radio frequency signal received at the antenna. Alternatively, the RF identification tag is either a battery-powered semi-passive tag, or an active tag.

According to another aspect of the invention, the RF transceiver includes a radio frequency oscillator generating a RF interrogation signal, an antenna coupled to the radio frequency oscillator, and a detector coupled between the RF oscillator and the antenna for recovering a subcarrier RF signal from the interrogation signal.

According to various other aspects of the invention, the interrogator includes a RF antenna configured to transmit and receive RF signals with a RF oscillator coupled to the antenna by a strip line. The RF oscillator is configured to generate a continuous wave RF interrogation signal, and means are included for recovering the subcarrier frequency generated by the tag oscillator from the frequency-modulated interrogation signal. According to one aspect of the invention, the subcarrier recovery means include two terminals on the strip line between the antenna and the oscillator, the two terminals phase shifted from one another by ninety degrees. The recovered subcarrier frequency signal is amplified and applied to a comparator coupled between the two terminals on the strip line. A processor coupled to an output of the detector is configured to sample the recovered subcarrier radio frequency signal and determine a frequency of the recovered subcarrier radio frequency signal. The processor is further configured to output a signal indicative of the frequency of the recovered subcarrier signal.

According to yet other aspects of the invention, a method is provided for performing radio frequency identification, the method including generating a continuous wave RF interrogation signal in an interrogator/reader, detecting the RF interrogation signal in a RF identification tag, responsively modulating the RF interrogation signal in the RF identification tag with a subcarrier frequency; and modulating the frequency-modulated interrogation signal back to the interrogator/reader that generated the original RF interrogation signal.

According to one aspect of the method of the invention, the RF identification tag modulates the original RF interrogation signal by operating an oscillator, such as a single-transistor oscillator, in the RF tag and using the output of the oscillator to modulate the RF interrogation signal. The frequency-modulated signal is applied to an antenna portion of the RF tag for transmission back to the interrogator/reader.

According to still other aspects of the invention, the method includes recovering with the interrogator/reader the subcarrier frequency signal from the modulated interrogation signal, determining the frequency of the recovered subcarrier signal, and generating a signal indicative of the frequency of the recovered subcarrier signal.

DETAILED DESCRIPTION OF THE INVENTION

In the Figures, like numerals indicate like elements.

Figure 1:
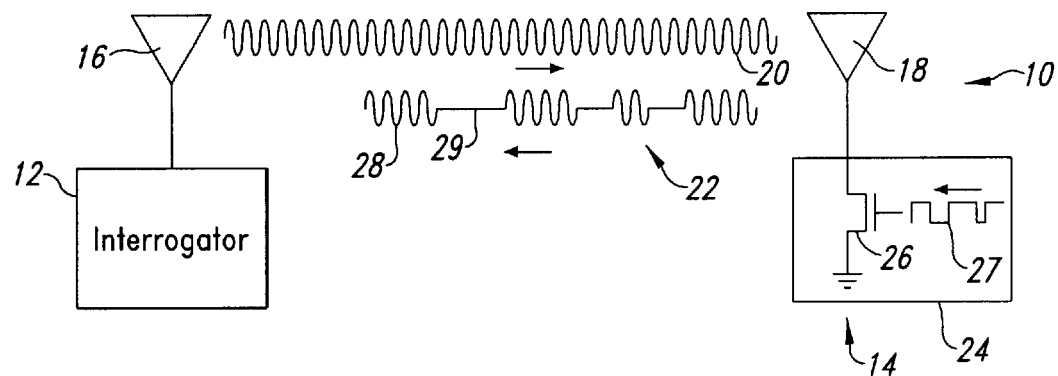
FIG. 1 illustrates a RF identification (RFID) tag system of the prior art for facilitating the monitoring of remote objects.
Figure 2:
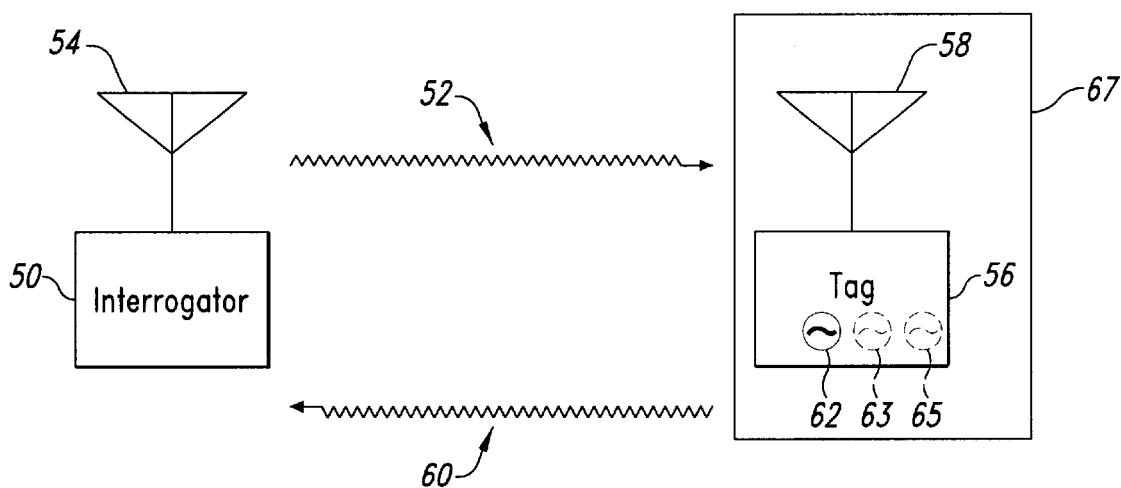
FIG. 2 is an illustration of the operation of the frequency-modulated continuous wave backscatter RFID tag system of the invention.

FIG. 2 illustrates the operation of the modulated frequency RFID tag system of the invention, where an interrogator 50 of the invention transmits a radio frequency (RF) interrogation signal 52 via an antenna 54. A backscatter RF tag 56 of the invention receives the interrogation signal 52 at an antenna 58 and responsively produces a modulated response signal 60. The RF tag 56 produces the modulated response signal 60 by modulating the interrogation signal 52 with a low frequency signal, for example, a frequency in the audio range, and modulates the modulated signal 60 back to the interrogator 50 via the antenna 58. The modulated response signal 60 thereby identifies the currently responding RF tag 56 as one of a unique class of RF tags 56 operating at a particular frequency within detection range of the interrogator 50.

Several RF tags 56 of the invention may be operating within range of a single interrogator 50. While the response signal 60 may not be unique for each individual RFID tag 56, an identification code embedded in the modulation of the response signal 60 satisfactorily identifies each RF tag 56 as belonging to a predetermined type or class of tag having particular qualities or privileges. For example, such identification is useful for identifying a class of vehicle by make or model, for identifying a person as male or female or as having a particular grade or position within a corporate, military, or governmental organization. In another example, the RF tag 56 of the invention is used with the interrogator 50 to identify a level of security or authorization whereby a person is permitted access to a secured area, such as a military base, or machine, such as a secure computer. Adaptive displays, such as in museums or galleries, are tailored using the RFID tag system of the invention according to, for example, the age group or language of an individual viewing the display.

The RF tag 56 is preferably configured, as described below, with a single frequency modulation (FM) oscillator 62 at its core. The RF tag 56 alters the received interrogation signal 52 by applying the output of the FM oscillator 62 to the base frequency interrogation signal 52, such that the output of the base frequency swings between different discrete frequencies as a rate determined by the operational frequency of the FM oscillator 62. The signal generated by FM oscillator 62 is mixed with the continuous wave RF interrogation signal 52 as a subcarrier frequency signal and is modulated back to the interrogator 50 via RF tag antenna 58. Interrogator 50 receives the response signal 60 at its antenna 54. A circuit (described below) within interrogator 50 removes the continuous wave carrier signal and analyzes the resulting subcarrier signal to determine the type or class of the currently responding RF tag 56. Any number of different "classes" of RF tags 56 can be configured, each with a different predetermined subcarrier signal frequency.

The interrogator 50 is programmed to identify each class by its subcarrier frequency and respond accordingly.

According to a passive embodiment of RF tag 56, the RF tag 56 is quiescent until within range of an interrogator 50 transmitting an interrogation signal 52. Power from the interrogation signal 52 activates the FM oscillator 62 and drives it to generate a frequency-modulated signal that is mixed with the interrogation signal 52. The RF tag 56 uses the energy in the RF interrogation signal 52 to generate and modulate the response signal 60 back to the interrogator 50.

FIG. 2 is just one embodiment of an RF tag 56 of the invention having at its core a single transistor-based FM oscillator 62. If more discrimination between RF tags 56 is desired, additional oscillators 62 are optionally utilized. Additional oscillators 63, 65 (shown in phantom in FIG. 2) provide a larger number of unique waveforms, which result in a larger number of uniquely identifiable classes.

Figure 3:
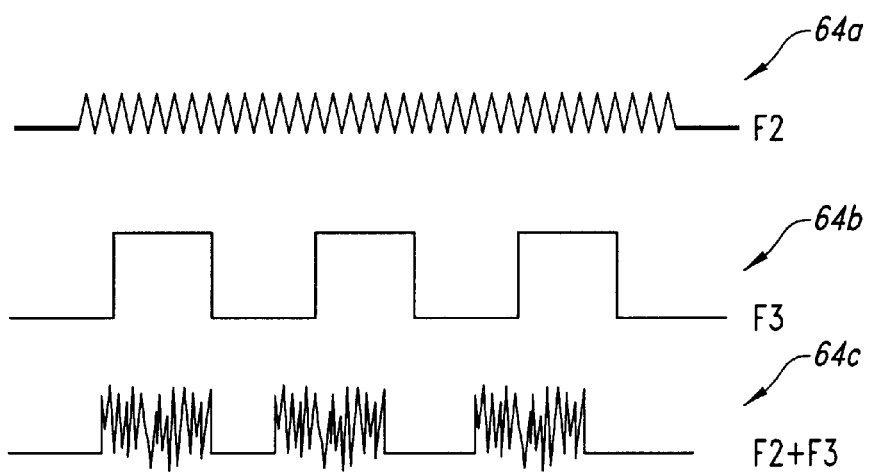
FIG. 3 illustrates just a few of the uniquely different waveforms possible by practicing the frequency-modulated continuous wave backscatter RFID tag system of the invention with the addition of a single oscillator.

FIG. 3 illustrates just a few of the uniquely different waveforms 64a, 64b, 64c possible with the addition of a single oscillator 62.

Figure 4:
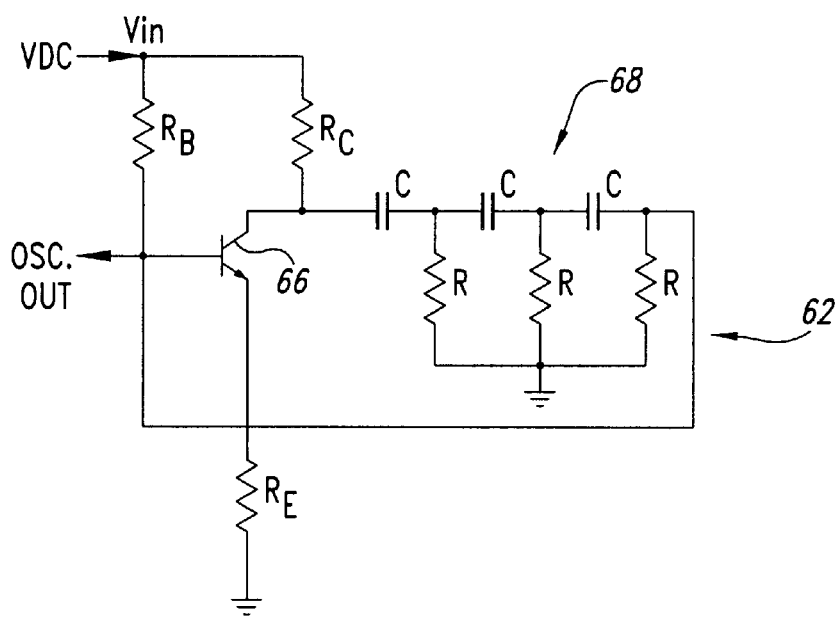
FIG. 4 illustrates one embodiment of the RF tag oscillator of the invention.

FIG. 4 illustrates one embodiment of oscillator 62 of the RF tag 56. According to the embodiment of FIG. 4, oscillator 62 is a simple oscillator based on a single transistor 66, preferably an N-P-N bipolar transistor 66 in combination with a R-C phase shift network 68. A single transistor in a circuit can shift the phase 180° from the base to the collector. However, in order for the circuit to oscillate, the phase shift between the base and the collector must be 360°. A capacitive-inductive circuit (not shown) around the transistor 66 can shift the phase by the additional 180° required for oscillation. However, the R-C network 68 accomplishes the same 180° of phase shift without an inductor, and the network 68 and tag are therefore more easily produced on a silicon die 67 (represented in FIG. 2). Given the R-C network 68, the circuit oscillates at a predetermined frequency $F_1$, which is a function of the resistive values of R and $R_c$ and the capacitive value of C, according to equation 1.

$$F_1 = \frac{1}{2\pi C} \times \sqrt{6R^2 + 4RR_c} \quad \text{(Eq. 1)}$$

As mentioned above, the oscillator 62 sits idle until energized by power developed from the RF interrogation signal 52. The power to operate oscillator 62 is injected at a terminal $V_{IN}$. The output of oscillator 62 is provided at the base of the transistor 66 and is applied to drive the modulation circuitry of RF tag 56.

Figure 5:
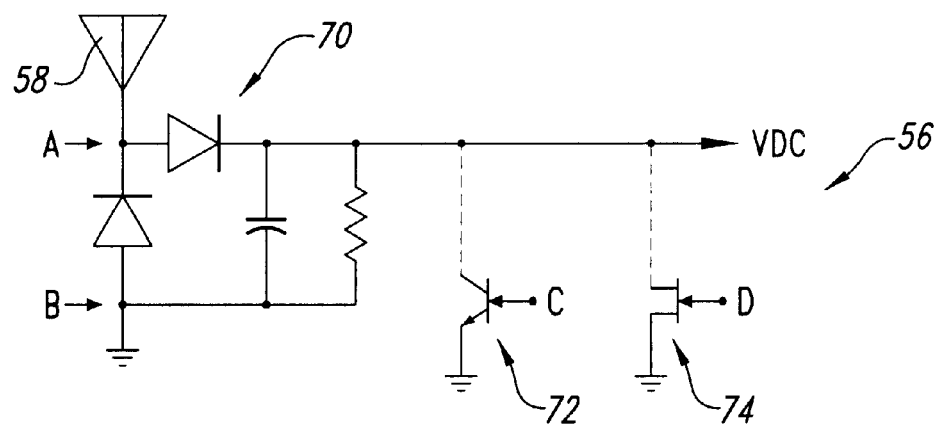
FIG. 5 illustrates one embodiment of the modulation circuitry of the RF tag of the invention.

FIG. 5 illustrates modulation circuitry 70 of backscatter RF tag 56, including antenna 58. Incident RF energy beamed at the RF tag 56 by the interrogator 50 is received at the antenna 58. Circuitry 70 of the RF tag 56 transforms the incident RF energy into a DC voltage VDC input into the oscillator 62. The RF energy, for example, is rectified by a diode and filtered by a capacitor before being applied to the oscillator 62.

The output of the oscillator 62 is optionally fed into the circuitry 70 of the RF tag 56 at any of several points. For example, the output of the oscillator 62 is input at either of terminals A or B with substantially the same effect of modulating of the RF interrogation signal 52 with a subcarrier frequency and generating the response signal 60. Alternatively, the output of the oscillator 62 is injected as a digital signal through a bipolar transistor 72 at a terminal C or through a field effect transistor (FET) 74 at terminal D. According to either configuration, the oscillator 62 modulates the RF interrogation signal 52 with a subcarrier frequency that is modulated as the response signal 60 back to the interrogator 50.

Figure 6:
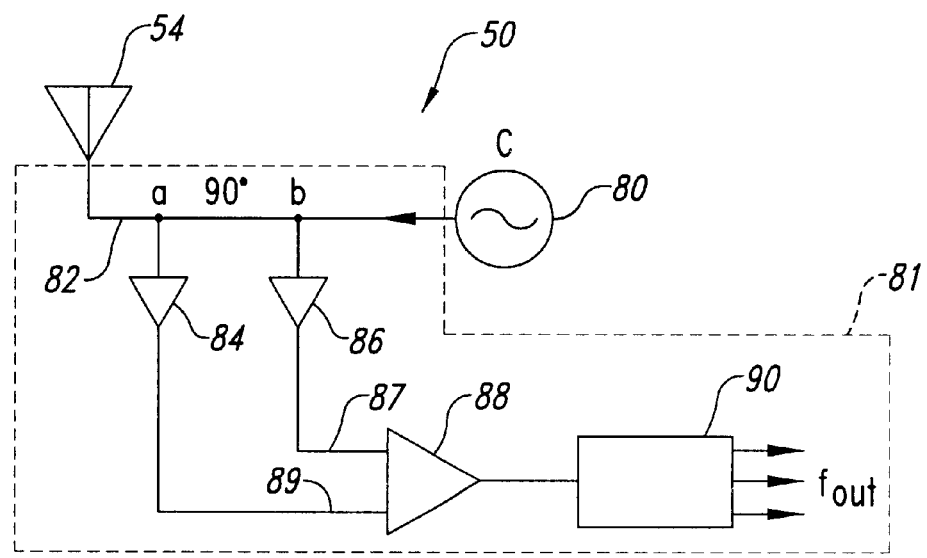
FIG. 6 is an exemplary block diagram of the interrogator/reader of the invention.

FIG. 6 is an exemplary block diagram of the interrogator/reader 50 according to one embodiment of the invention. The interrogator 50 is a transceiver based upon RF oscillator 80 that generates the continuous wave RF interrogation signal 52, shown in FIG. 2. A detector circuit 81 is supplied in the interrogator 50 for recovering the subcarrier frequency signal generated by the oscillator 62 from the response signal 60 output by the RF tag 56, as shown in FIG. 2. For example, the subcarrier signal is recovered by picking the signal off of a strip line 82 between the antenna 54 and the RF oscillator 80 at two points a and b that are phase shifted from one another by 90°, or by another equivalent means.

The recovered subcarrier frequency signal is preferably passed through a pair of amplifiers 84 and 86 with the amplified signal applied to first and second terminals 87, 89, respectively, of a comparator 88, such as a differential amplifier/comparator or another equivalent circuit. The comparator 88 cleans the signal of the original interrogation signal 52 generated by the interrogator RF oscillator 80. The resultant clean signal is applied to a signal processor 90 that samples the signal, determines the subcarrier frequency of oscillation, and outputs a signal fouT indicative of the class identification of the currently responding RF tag 56. The signal processor 90 is, for example, simply a circuit configured of analog filters. Alternatively, the signal processor 90 is either of a microprocessor or a digital signal processor (DSP) or another suitable signal processor.

In operation, the RF oscillator 80 generates a continuous wave RF interrogation signal 52 that is transmitted through antenna 54 to any RF tag 56 that is currently within the detection distance of the interrogator 50. The RF tag 56 is activated by the RF signal at its antenna 58. In response to receiving the interrogation signal 52, the RF tag 56 produces the frequency-modulated response signal 60 that is modulated back to the interrogator 50 through the tag antenna 58 by a process known as backscatter. The circuitry 70 of the RF tag rectifies and filters the RF energy in the received interrogation signal 52 and applies the rectified voltage VDC to the RF oscillator 62. The RF oscillator 62 generates a subcarrier frequency with which it modulates the continuous wave RF interrogation signal 52. The RF tag 56 modulates the response signal 60 to the interrogator 50 as the continuous wave RF interrogation signal 52 modulated with the subcarrier frequency generated by the oscillator 62. The response signal 60 is received at the antenna 54 of the interrogator 50. The subcarrier frequency is recovered from the interrogator 50 by picking the signal off of the strip line between the antenna 54 and the interior oscillator 80, as described above. The recovered signal is amplified and cleaned of the original interrogation signal 52 generated by oscillator 80. A DSP 90 or another suitable signal processor samples the signal and determines the oscillation frequency of the currently responding RF tag 56. The interrogator 50 thus determines the "class" of the RF tag 56 and produces an output as a function of the determined class.

Figure 7:
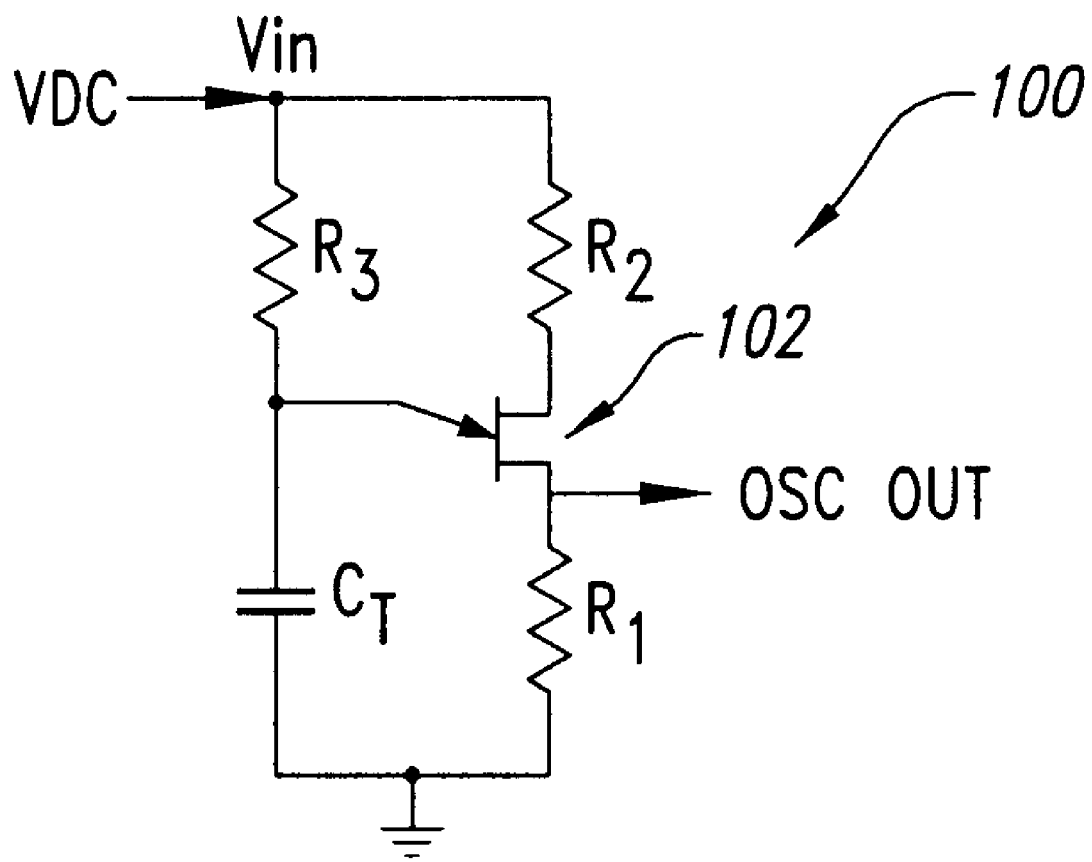
FIG. 7 illustrates an alternative oscillator circuit for use in the RF tag of the invention.

FIG. 7 illustrates an alternative oscillator circuit 100 for use in the RF tag 56 of the invention, in place of the single transistor oscillator signal 62. The oscillator circuit 100 is based on a uni-junction transistor (UJT) 102, also known as a double-based diode. The UJT oscillator circuit 100 is used in the RF tag 56 of the invention as a simple relaxation oscillator. The UJT oscillator circuit 100 is driven by the rectified voltage VDC input at a terminal $V_{IN}$, similarly to the oscillator 62 described above. As shown in FIG. 7, the oscillator circuit 100 includes the UJT 102. A resistor $R_1$ controls the pulse output voltage. A second resistor $R_2$ is primarily used for temperature compensation of the oscillator circuit 100. The output pulse frequency $F_2$ of UJT oscillator circuit 100 is an approximate function of the resistance value of a resistor $R_3$ and the capacitance value of a capacitor $C_T$, according to equation 2.

$$F_2 = \frac{1}{R_3 C_T} \qquad (Eq.\ 2)$$

The oscillation of the UJT oscillator circuit 100 is typically limited to a frequency below 1 MHz. As described above in connection with the single-transistor oscillator circuit 62, the output of the UJT oscillator circuit 100 is applied to any of several terminals A, B, C, D, shown in FIG. 5, to modulate the continuous wave RF interrogation signal 52 transmitted by the interrogator 50.

The frequency-modulated backscatter RFID system of the invention is well suited for the production of large numbers of RF tags 56. As described, the RF tag 56 is implemented with very few components, which results in a very low per-unit cost. The small number of components also results in an extremely small size for each individual RF tag 56. The power required to operate the onboard circuitry of RF tag 56 is very low, allows the invention to be implemented in a passive RF tag that is powered by the energy in the interrogating field for short distance applications. The low power requirement also provides a long useful battery lifetime when the invention is implemented in either a battery powered semi-passive RF tag or a battery powered active RF tag.

CLOSURE

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A microwave radio frequency identification tag, comprising:

an antenna configured to receive a radio frequency signal;

a rectification circuit having a first input coupled to the antenna, a second input, and an output; and a single-transistor R-C tag oscillator having an input coupled to the output of the rectification circuit and an output coupled to the second input of the rectification circuit, the tag oscillator being structured to modulate the radio frequency signal received at the antenna with a subcarrier signal-frequency signal and to apply the modulated radio frequency signal to the antenna configured to operate at microwave radio frequencies and formed on a silicon die.

2. The tag of claim 1, wherein the tag oscillator is activated by the radio frequency signal received at the antenna.

3. The tag of claim 1, wherein the tag oscillator is powered by the radio frequency signal received at the antenna.

4. The tag of claim 2, wherein the tag oscillator further comprises a uni-junction transistor oscillator.

5. A microwave radio-frequency identification system, comprising:

a radio frequency identification tag configured to operate at microwave radio frequencies and formed on a silicon die, comprising:

an antenna configured to receive a continuous wave radio frequency signal;

a rectification circuit having a first input coupled to the antenna, a second input, and an output; and a single-transistor R-C tag oscillator having an input coupled to the output of the rectification circuit and an output coupled to the second input of the rectification circuit, the tag oscillator structured to modulate the radio frequency signal received at the antenna with a subcarrier single-frequency signal and to apply the modulated radio frequency signal to the antenna;

and further comprising an interrogator that includes:

a radio frequency oscillator configured to generate the continuous wave radio frequency signal;

an antenna coupled to the radio frequency oscillator; and the means for recovering the subcarrier single-frequency signal generated by the tag oscillator from the modulated radio frequency signal.

6. A microwave radio frequency identification system, comprising:

a radio frequency identification tag configured to operate at microwave frequencies and formed on a silicon die, comprising:

an antenna configured to receive a continuous wave radio frequency signal;

a rectification circuit having a first input coupled to the antenna, a second input, and an output; and a single-transistor R-C tag oscillator having an input coupled to the output of the rectification circuit and an output coupled to the second input of the rectification circuit, the tag oscillator structured to modulate the radio frequency signal received at the antenna with a subcarrier single-frequency signal and to apply the modulated radio frequency signal to the antenna;

and further comprising an interrogator that includes:

an antenna configured to transmit and receive continuous wave radio frequency signals;

a radio frequency oscillator configured to generate a continuous wave radio frequency signal and coupled to the antenna by a strip line;

a first terminal on the strip line phase shifted from a second terminal on the strip line by ninety degrees; and a comparator coupled between the first and second terminals on the strip line.

7. A radio frequency identification system, comprising:

(a) a radio frequency transceiver including:

(i) a radio frequency oscillator generating a radio frequency interrogation signal, (ii) an antenna coupled to the radio frequency oscillator, and (iii) a detector coupled between the radio frequency oscillator and the antenna for recovering a subcarrier radio frequency signal from the interrogation signal; and (b) an identification tag formed on a silicon die, including:

(i) a radio frequency antenna configured to receive the radio frequency interrogation signal, (ii) a rectifier having a first input coupled to the radio frequency antenna, a second input, and an output, and (iii) at least one single-transistor R-C tag oscillator having an input coupled to the output of the rectifier and an output coupled to the second input of the rectifier, the tag oscillator generating a single-frequency output signal for frequency modulating the radio frequency interrogation signal with at least one subcarrier radio frequency signal configured to operate at microwave radio frequencies and formed on a silicon die.

8. The radio frequency identification system of claim 7, wherein the at least one tag oscillator is further configured to generate the output signal in response to the radio frequency interrogation signal received at the radio frequency antenna.

9. The radio frequency identification system of claim 7, wherein the rectifier is further configured to transform energy in the radio frequency interrogation signal received at the radio frequency antenna to power the tag oscillator.

10. The radio frequency identification system of claim 7, wherein the radio frequency transceiver further comprises a processor coupled to an output of the detector and configured to sample the recovered subcarrier radio frequency signal and determine a frequency of the recovered subcarrier radio frequency signal.

11. The radio frequency identification system of claim 10, wherein the processor is further configured to output a signal indicative of the frequency of the recovered subcarrier radio frequency signal.

12. The radio frequency identification system of claim 7, wherein the tag oscillator further comprises a plurality of single-transistor oscillator.

13. The radio frequency identification system of claim 7, wherein the tag oscillator further comprises a uni-junction transistor as the single transistor R-C tag oscillator.

14. A method for performing radio frequency identification, the method comprising:

generating a microwave radio frequency interrogation signal;

detecting the radio frequency interrogation signal in a radio frequency identification tag;

responsively detecting the radio frequency interrogation signal and frequency modulating the radio frequency interrogation signal in the radio frequency identification tag with a subcarrier signal-frequency signal using at least one single-transistor R-C oscillator formed on a silicon die; and returning the modulated radio frequency interrogation signal.

15. The method of claim 14, wherein the generating a radio frequency interrogation signal further comprises generating a continuous wave radio frequency interrogation signal.

16. The method of claim 14, wherein frequency modulating the radio frequency interrogation signal comprises generating a frequency modulating signal in the radio frequency identification tag that further comprises operating the oscillator in the radio frequency identification tag, and the sending modulated radio frequency interrogation signal further comprises applying the modulated radio frequency interrogation signal to an antenna portion of the radio frequency identification tag.

17. The method of claim 16, wherein the oscillator in the radio frequency identification tag further comprises a plurality of single-transistor oscillators.

18. The method of claim 14, further comprising detecting the transmitted modulated radio frequency interrogation signal in an interrogator generating the radio frequency interrogation signal.

19. The method of claim 18, further comprising recovering the subcarrier single-frequency signal from the modulated radio frequency interrogation signal.

20. The method of claim 19, further comprising determining a frequency of the recovered subcarrier single-frequency signal.

21. The method of claim 20, further comprising generating in the interrogator a signal indicative of the frequency of the recovered subcarrier single-frequency signal.

* * * * *